United States Patent Office 3,100,393
Patented Aug. 13, 1963

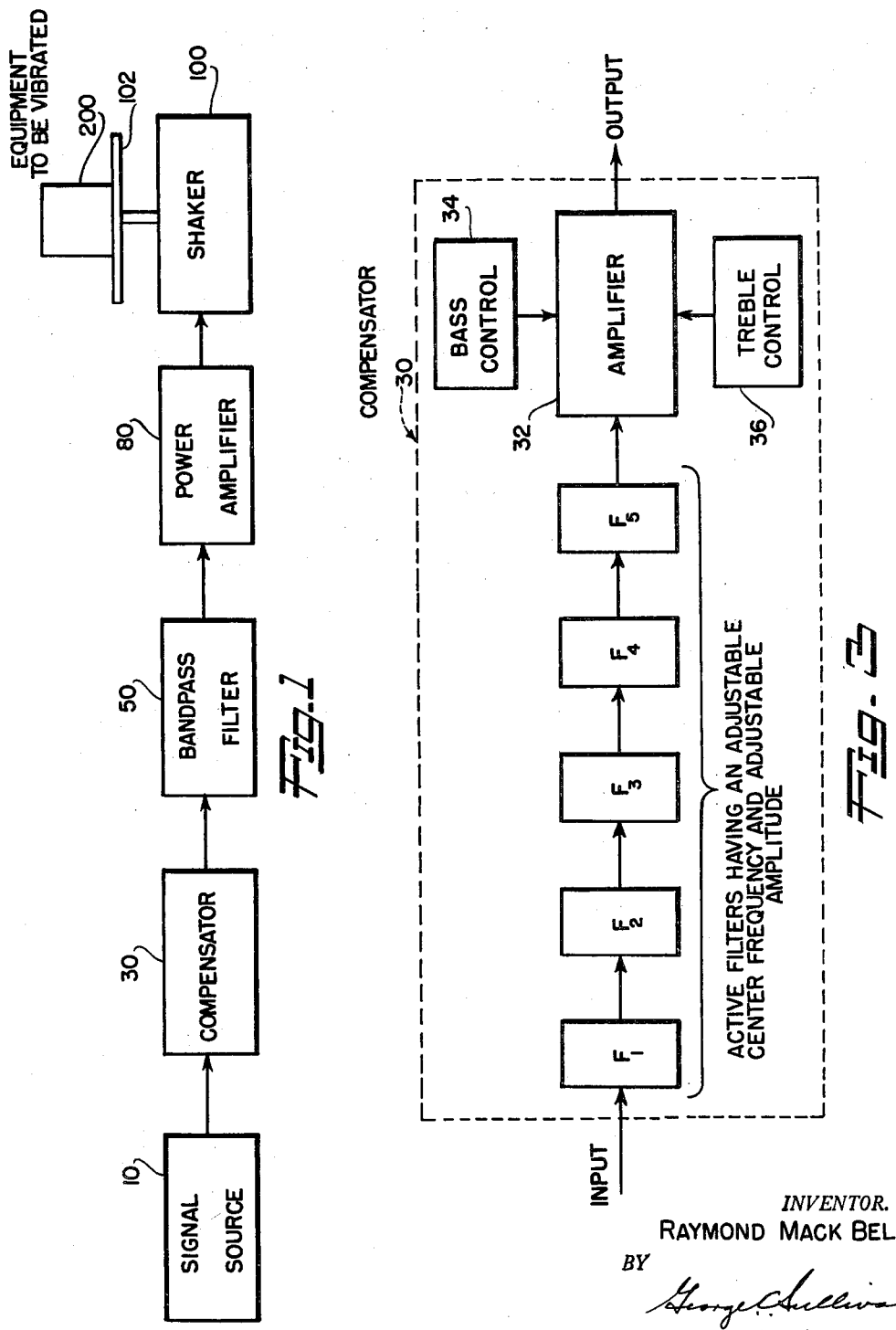

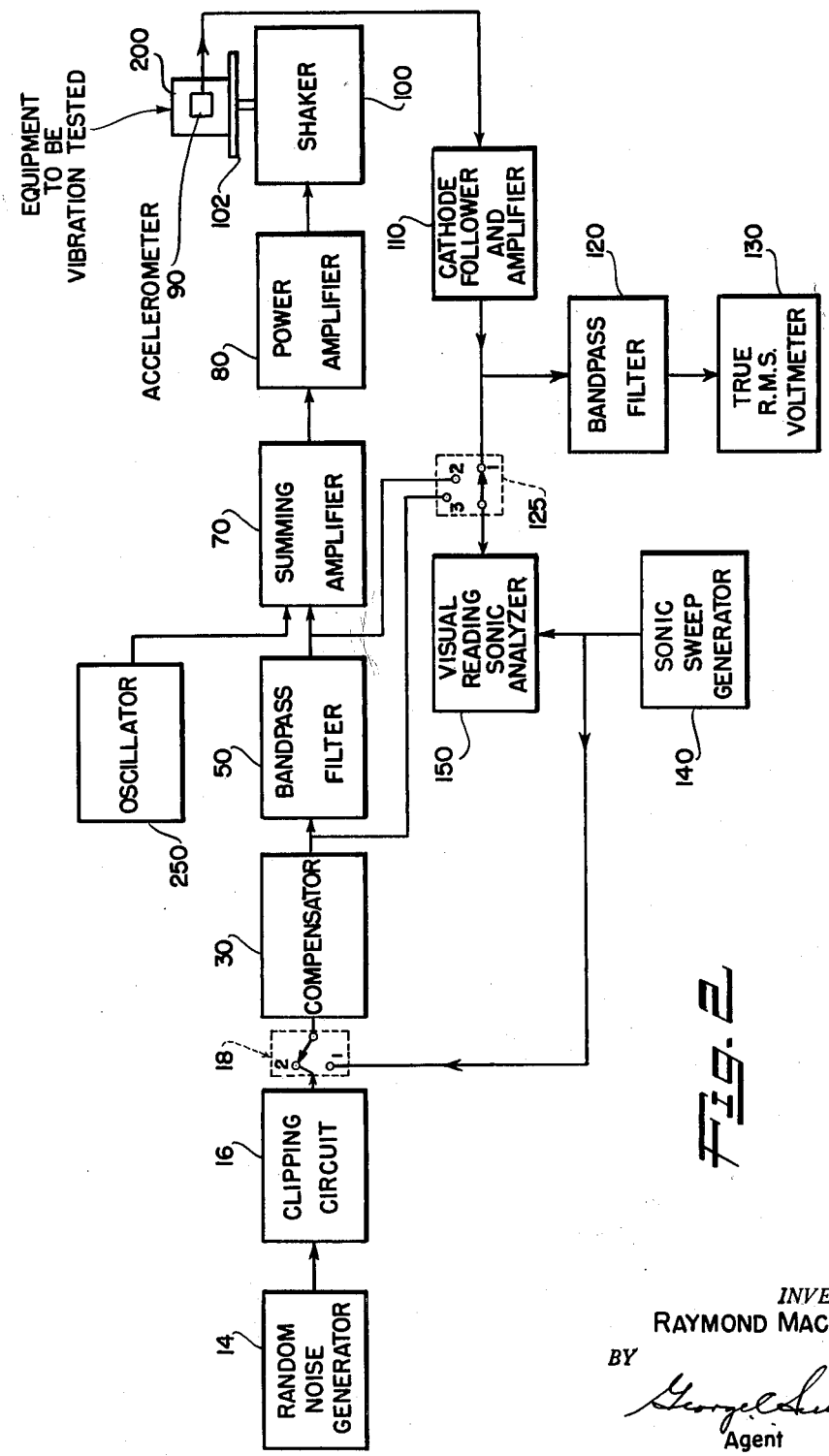

3,100,393
RANDOM VIBRATION TESTING SYSTEM
Raymond Mack Bell, Sunnyvale, Calif., assignor to Lockheed Aircraft Corporation, Burbank, Calif.
Filed Jan. 4, 1960, Ser. No. 148
5 Claims. (Cl. 73—71.6)

This invention relates generally to vibration testing, and more particularly to improved means for vibration testing a test specimen in a predetermined random vibration environment.

In recent years the need for vibration testing various types of equipment under predetermined vibration conditions has become of considerable importance. The reason for this is that if the equipment is designed without taking into account the vibration it will experience during operation, its performance, reliability and life may be severely affected. It has become standard practice, therefore, to include vibration test specifications along with other performance specifications in the design of equipment which will be subjected to any significant vibration during operation. Such vibration specifications usually require that the equipment be vibrated under conditions which simulate actual vibration conditions.

However, the simulation of these actual vibration conditions has proved to be of very considerable difficulty, particularly where a predetermined random vibration condition is to be simulated. As a result, the setting up of vibration test apparatus to provide a predetermined random vibration condition has become a most time-consuming operation involving expensive and complex equipment. In fact, it is not unusual for an operator to spend almost two working days to set up present-day vibration test equipment to perform a given random vibration test.

Accordingly, it is the broad object of this invention to provide improved means for vibrating equipment in accordance with predetermined vibration conditions.

A more specific object of this invention is to provide improved means for subjecting equipment to a predetermined random vibration.

Another object of this invention is to provide apparatus which operates in cooperation with conventional vibration test equipment to enable a random vibration test to be set up and performed in a very rapid and convenient manner.

An additional object of this invention is to provide the means of the aforementioned objects in relatively simple and inexpensive form.

In accordance with the present invention, the above mentioned objects are achieved by means of vibration test apparatus and an improved method of operation thereof in which the vibration output of the electromagnetic shaker which produces the vibration can be visually determined, readily modified and conveniently operated to provide any predetermined vibration test conditions. The specific nature of the invention as well as other objects, uses and advantages thereof, may best be explained by means of the following description and the accompanying drawing in which:

FIG. 1 is a block and schematic diagram of the basic vibration test apparatus employed for vibration testing.

FIG. 2 is a block and schematic diagram of the improved vibration testing system in accordance with the present invention.

FIG. 3 is a more detailed block diagram of the compensator of FIG. 1.

In FIG. 1 a block diagram of a basic vibration test system is shown which is conventionally employed for vibration testing. This system basically comprises an electrodynamic shaker 100 having a table 102 to which the equipment to be vibrated 200 is mounted, and a shaker energizing system indicated basically by a signal source 10, a compensator 30, a bandpass filter 50 and a power amplifier 80. The signal source 10 may be any suitable source, either periodic, random, or otherwise if so desired. The compensator 30 normally comprises a plurality of filter networks which are capable of providing a predetermined frequency characteristic for the signal obtained from the signal source 10. The output of the compensator 30 is fed to a bandpass filter 50 which is used to set the overall bandpass of the system. The output of the bandpass filter 50, which is then the desired energizing signal, is fed to a power amplifier 80 which amplifies this signal to the level necessary to operate the shaker 100.

Before describing in detail the specific embodiment of the invention illustrated in FIGS. 2 and 3 of the drawing, it will be helpful to consider some general background information with regard to random vibration testing.

Performance specifications which require that the equipment be vibrated under predetermined random vibration conditions include a minimum of four items. These are:

(1) Power spectral density—P.S.D.
(2) Bandwidth—B
(3) Power distribution—P.D., and
(4) Peak to R.M.S. ratio—R The method used to describe the above 4 items in a random vibration specification may vary to some extent but without any one of them, a random vibration environment cannot be completely described or specified in any language. A discussion of the above 4 items will now follow in order to clearly indicate their intended meanings.

The term power spectral density, P.S.D., includes a consideration of both power and frequency. Power spectral density as it appears by itself in a random vibration specification is a number which is meaningless. To have meaning the power spectral density P.S.D. is necessarily accompanied by the definition of the bandwidth B which establishes the frequency band within which the random motion is to be considered. In the strictest of terms, therefore, power spectral density P.S.D. may be defined as the limit of the mean square acceleration level divided by the frequency band considered as the width of the band approaches zero. In more simple terms this is equivalent to stating that the R.M.S. acceleration level is equal to the square root of the product of the power spectral density P.S.D. and the bandwidth B. The bandwidth B defines the particular upper and lower limits within which the frequency of the randomly varying amplitude components or acceleration components shall exist, and is generally accepted to be the three db points in the output frequency characteristics of the shaker which produces the vibrations.

The power distribution P.D. is essentially the shape of the curve of power spectral density P.S.D. over the bandwidth B and is generally required to be flat throughout; that is, the power spectral density is required to be constant for any sample of the shaker's output spectrum that is taken within the bandwidth B, provided that the averaging time for each sample is in some constant inverse relationship to the bandwidth of the sample. In many specifications, the power distribution P.D. required will not be flat but one which varies considerably with frequency. Also, the power distribution P.D. may be defined in many different ways. In some specifications it will be defined as constant power per cycle, or, it may be defined only in terms of small increments of flat power distribution. The summation of these small increments together, as nearly as possible, represent the desired overall power distribution. An example of this type of vibration environment would be the vibration output of a rocket engine where the acceleration values are fairly low in the lower frequency ranges, increase to a fairly well defined peak in slightly higher frequencies depending upon the nozzle size and the engine power, then decrease at a fairly uniform rate through the higher frequency range.

The peak to R.M.S. ratio R is a statement of what the peak acceleration shall be with respect to the overall R.M.S. acceleration level. It is generally required to be a ratio of the order of 3 to 1, but it may be specified as some other value. However, the maximum ratio obtainable from any vibration equipment regardless of what the specification calls for is the ratio of the peak acceleration obtainable from the loaded shaker to the R.M.S. acceleration level at which the test is to be performed.

A fifth item which is not listed above but which is usually included in a random vibration specification is the time duration of the test. If the desired results of any test depend upon the fatigue characteristics of the specimen, the time duration of the specimen's exposure to the random vibration environment must be given. However, if the type of failure to be considered is one in which deviations in a critical tolerance are to be considered where peak displacement is the major consideration, time duration of the test may not be a required parameter.

At first glance, it might seem that in order to get a predetermined vibration characteristic from the shaker 100, an operator need only adjust the compensator 30 and the bandpass filter 50 in FIG. 1 to provide the desired energizing signal which will cause the shaker to vibrate as desired. This would be true if the energizing signal which would cause the shaker to vibrate in the desired predetermined manner were known. However, because the response of the shaker 100 varies widely with load and frequency, and may have resonances in and out of the bandwidth B under consideration, the required energizing signal is practically impossible to predict. The only way it can be determined is by first determining the response of the shaker under actual load and vibration conditions, and then adjusting the compensator 30 and the bandpass filter 50 to provide the desired vibration output from the shaker 100. At present, this is done by a variety of time-consuming procedures in which the signal source 10 is replaced by a sinewave generator and for each of a large number of frequencies to which the generator is manually set, the compensator 30 is adjusted to provide a desired R.M.S. acceleration value for the shaker 100. The signal source 10 is then returned and the specimen vibrated with the hope that the output vibration produced by the shaker 100 when fed by the signal source 10 will have the desired predetermined response. Actual experience has shown, however, that this procedure for setting up a shaker 100 for a random vibration test, or any other complex vibration test, does not provide the desired vibration response from the shaker 100.

In the block and schematic diagram of FIG. 2, an embodiment of a vibration testing system in accordance with the invention is illustrated. This embodiment permits vibration test equipment to be set up for a random vibration test in one-half hour as compared to the two days required by previously available equipment. This is accomplished, as will hereinafter be described, by means and methods which permit the compensator 30 included in both the basic system of FIG. 1 and the embodiment of the invention shown in FIG. 2 to be rapidly and conveniently adjusted to provide the desired output response from the shaker 100. The block diagram of FIG. 3 illustrates a most desirable form of the compensator 30 which may advantageously be employed in accordance with the invention.

In FIG. 2, an electrodynamic shaker 100 is provided as in FIG. 1 with a table 102 to which the equipment to be vibration tested 200 is suitably mounted. An accelerometer 90 is mounted to the vibration table 102, or to the equipment to be vibration tested 200 as shown, in order to provide a signal which is indicative of the vibration which the equipment is experiencing. The output of the accelerometer 90 is fed to a cathode follower and amplifier 110 which amplifies the accelerometer output to a suitable level. The output of the cathode follower and amplifier 110 is then passed to a bandpass filter 120 and an R.M.S. voltmeter 130 which cooperate to provide a true R.M.S. reading of the acceleration which the equipment 200 is experiencing at any given time.

A single-pole, triple-throw switch 125 has its movable arm connected to the input of a visual reading sonic analyzer 150 having a cathode ray display tube so as to permit either the output of the cathode follower and amplifier 110, which is connected to one of the fixed contacts of the switch 125, or the outputs from two other points of the energizing portion of the system to be applied to the visual reading sonic analyzer 150. A sonic sweep generator 140, connected to the sonic analyzer 150 so as to cooperate therewith in a conventional manner, produces a sinusoidal output which is swept over a band of frequencies at a given repetition rate which may be of the order of 1 cycle per second. The repetition rate of the sweep generator 140 is made sufficiently large so that the frequency spectrum of the input signal applied to the sonic analyzer 150 is continuously displayed on the cathode ray tube thereof. A visual reading sonic analyzer and a sonic sweep generator capable of continuously displaying the frequency response of a signal, such as respectively indicated at 150 and 140 in FIG. 2, are apparatus which are commercially available in a variety of forms, such as is obtainable from Panoramic Radio Products, Inc., of Mount Vernon, New York. When the movable arm of the switch 125 is in position 1 as indicated in FIG. 2 the visual reading sonic analyzer 150 displays the frequency spectrum of the acceleration output produced by the shaker 100.

From the above description in FIG. 2, it should be evident as to how the frequency spectrum of the shaker 100 is conveniently displayed on the visual reading sonic analyzer 150. It will now be shown how this visual display may be employed in cooperation with the associated elements of FIG. 2 to permit the shaker 100 and the energizing means to be rapidly and conveniently set up to provide a desired random vibration response.

For a random noise vibration test, a random noise generator 14 is used as the signal source 10 in FIG. 1. If desired, there may also be used a suitable tape-recorded noise signal. The output of the random noise generator 14 is fed to a clipping circuit 16 which clips off the peaks of the random noise generator 14 to provide a desired peak-to-R.M.S. ratio R for the shaker output. The output of the clipping circuit 16 is fed to the contact 2 of a single-pole, double-throw switch 18 whose movable arm is connected to the input of the compensator 30 corresponding to the compensator 30 of FIG. 1. The other contact 1 of the switch 18 is fed to the output of the sonic sweep generator 140 so that, when the movable arm of the switch 18 is connected to this fixed contact, the swept sinusoidal output of the sonic sweep generator 140 is fed to the compensator 30.

The output of the compensator 30 is fed to the bandpass filter 50, which is the same as that of FIG. 1, and is also fed to the fixed contact 3 of the switch 125 so that the output of the compensator 30 can be displayed on the visual reading sonic analyzer 150 when its movable arm is in switch position 3. The output of the bandpass filter 50 is fed to a summing amplifier 70 and also to the remaining fixed contact of the switch 125, which is switch contact 2, so that the output of the bandpass filter 50 may likewise be displayed on the visual reading sonic analyzer 150. The summing amplifier 70 permits the output of the bandpass filter 50 to be combined with any other suitable signal such as might be provided by an oscillator 250 where it is desired to superimpose an additional signal along with the random signal. Where only a random vibration is desired, the summing amplifier 70 may be omitted. The output of the summing amplifier 70 is fed to the power amplifier 80, corresponding to the power amplifier 80 in FIG. 1, which amplifies the signal to a suitable level to operate the shaker 100.

It will be noted that the elements constituting the vibration testing system in accordance with the invention have been represented in FIG. 1 in block form. Since each of the electronic devices represented by these blocks is well known in the art and can readily be provided in a variety of forms, further details thereof will not be given, except for the preferred compensator 30 shown in FIG. 3. The description of these elements as so far given, along with the following detailed explanation of the operation of the embodiment of FIG. 2, will be entirely sufficient to permit those skilled in the art to readily provide any of the necessary electronic devices in order to practice this invention.

The operation of the embodiment of FIG. 2 may now be explained. First, the random noise generator 14 is chosen to have a spectrum roughly corresponding to the power spectral density P.S.D. required by the vibration test specification. The proper adjustment of the compensator 30 and the bandpass filter 50 will then provide the required power distribution P.D. and the bandwidth B, while adjustment of the clipping circuit 16 provides the required peak-to-R.M.S. ratio R. These adjustments are accomplished as follows. The switch 18 is initially placed with its movable arm in switch 1 so that the random noise generator 14 is disconnected and the output of the sonic sweep generator 140 is fed to the compensator 30. The output of the sonic sweep generator 140, therefore, passes through the compensator 30, the bandpass filter 50, the summing amplifier 70 and the power amplifier 80 to the shaker 100. Since the sonic sweep generator 140 produces a sinusoidal output signal which sweeps a predetermined band of frequencies, the shaker 100 will be subjected to this sweeping band of frequencies as modified by the compensator 30 and the bandpass filter 50. The movable arm of the switch 125 is placed in position 1 so that the output from the shaker 100 appears on the visual reading sonic analyzer 150.

The bandpass filter 50 is now set to its maximum bandwidth and the compensator 30 adjusted so that the shaker response is reasonably flat over the desired frequency bandwidth B as given by the vibration test specification, assuming a flat response is required. This is readily accomplished by observing the output of the shaker 100 on the visual reading sonic analyzer 150 and adjusting the compensator 30 for as reasonably a flat response as possible.

A highly advantageous form of the compensator 30 which may be used in accordance with the present invention is shown in FIG. 3. It can be seen that the compensator 30 comprises a plurality of active filters, $F_1$, $F_2$, $F_3$, $F_4$ and $F_5$, each having an adjustable center frequency and an adjustable amplitude control. The signal applied to the compensator 30 is successively fed through these filters $F_1$–$F_5$, each of these filters $F_1$–$F_5$ being adjusted to cover a predetermined range of frequencies within the bandwidth B of operation desired of the shaker 100. By adjusting the center frequency and amplitude of these filters, $F_1$–$F_5$, therefore, the response of the shaker 100 in each band of frequencies can conveniently be adjusted. In FIG. 3 only five filters are shown, but it is to be understood that many more filters could be provided if so desired, and usually more than five are so provided. The output of the last filter, which is the filter $F_5$ in FIG. 3, is fed to an amplifier 32 having a bass control 34 and a treble control 36 which permit the frequency response of the amplifier 32 to be adjusted. Thus, not only can each portion of the band be adjusted by means of the filters $F_1$–$F_5$, but also, the overall frequency response, that is, the high and the low ends, can be tailored to provide the desired overall frequency response at the output of the compensator 30. The visual reading sonic analyzer 150 permits the effect of each of the filters $F_1$–$F_5$ and the effects of the bass control 34 and the treble control 36 to be readily observed so that these adjustments can be made with considerable ease and accuracy.

When the desired frequency response from the shaker 100 is obtained for the swept sinusoidal signal provided by the sonic sweep generator 140, the movable arm of the switch 18 is then switched to position 2 as indicated in FIG. 2 so that the output from the random noise generator 14 and the clipping circuit 16 can be applied to the compensator 30. The output of the shaker 100 in response to the random noise signal with the compensator 30 adjusted using the swept sinusoidal output of the sonic sweep generator 140 as just described is now observed on the visual reading sonic analyzer 150. As previously indicated, the adjustment of the compensator 30 obtained by using the sonic sweep generator output as the input does not provide the desired output response of the shaker 100 when a random signal is applied in place of the sinusoidal signal, as will now be observed on the sonic analyzer 150. However, it does serve as a starting point from which the adjustments of the compensator 30 may be selectively varied to provide the desired shaker response. The use of this initial step where the sonic sweep generator 140 is applied to the compensator 30 is important because it is practically impossible to adjust the compensator 30 if the random signal is applied without some rough approximation of the correct adjustments. It should not be overlooked, however, that the compensator adjustment obtained using the output of the sonic sweep generator 140 is not sufficiently accurate for most purposes and will not provide the proper test results.

After the desired power distribution P.D. has been established by readjusting the compensator 30 while observing the display on the sonic analyzer 150 with the switch 18 in switch position 2, the required overall bandwidth B is then set by adjusting the bandpass filter 50 to provide the desired cut-off frequencies as indicated on the sonic analyzer 150. As was indicated previously, the bandpass filter 50 is initially set at its maximum bandwidth. This is of considerable importance for both of the previously described steps where the sonic sweep generator 140 and the random noise generator are successively used as the input to the compensator 30, because severe resonances often exist in the shaker response outside of the required frequency bandwidth B. The energization signal to the shaker 100 must therefore be adjusted to prevent these resonances from being harmonically excited during the vibration test, which would then vibrate the specimen at frequencies outside the desired band. Thus, if the bandpass filter 50 were first adjusted to the required bandwidth B, the visual reading sonic analyzer 150 would show the proper response within the band, but there might be resonances outside the desired band which should be damped out.

In summarizing, it will be understood that the compensator 30 is first adjusted by feeding to it the output from the sonic sweep generator 140 to obtain a rough approximation of the desired output response for the shaker 100. A random noise signal having a corresponding power spectral density is then applied to the compensator 30 and the compensator 30 readjusted to provide the desired output response of the shaker 100 for the random input signal as observed on the visual reading sonic analyzer 150. Since the bandpass filter 50 is at its maximum bandwidth resonances outside of the desired band can readily be observed and accounted for. Once this is done the bandwith of the bandpass filter 50 is then set to provide the bandwidth B required by the vibration test specification. The final step is to set the peak-to-R.M.S. ratio R by adjusting the clipping circuit 16 while observing the display on the sonic analyzer 150 and the reading on the R.M.S. voltmeter 120. Obviously, the bandpass filter 120 feeding the meter 150 is also set to the bandwidth B. The system is now set up for operation.

It should be realized that during the above-described setting up operation, a dummy load should be applied to the vibration table 102 which dynamically simulates the equipment to be vibration tested 200, and the accuracy of the adjustments should be checked at actual vibration amplitudes. Also, if desired, a signal from the oscillator 250 may now be superimposed on the random vibration signal by feeding the oscillator signal to the summing amplifier 70. The switch 125 is provided with the contacts 2 and 3 in addition to the contact 1 from the output from the cathode follower and amplifier 110 so that the outputs of the compensator 30 and the bandpass filter 50 may be observed if necessary during the set-up procedure.

It is to be understood in connection with this invention that the embodiment shown is only exemplary and that various modifications can be made in the construction and arrangement shown and described. For example, although the invention is described in connection with random vibration testing, the techniques herein described are also applicable to other types of predetermined vibration conditions at which equipment might have to be vibration tested. This invention, therefore, is to be considered as including all possible modifications and variations coming within the scope of the invention as defined in the appended claims.

I claim as my invention:

1. A vibration testing system comprising in combination: a shaker, means on said shaker to which a test specimen can be mounted for vibration, energizing means for said shaker constructed and arranged so as to permit an adjustment of the overall frequency response of a signal applied thereto and the frequency response of the applied signal in each of a plurality of frequency bands, an accelerometer mounted so as to provide a signal corresponding to the acceleration produced by said shaker, amplification means connected to said accelerometer, a visual reading sonic analyzer to which the output of said amplification means is fed, means for periodically sweeping said sonic analyzer through a band of sonic frequencies at a rate sufficient to provide a continuous visible display thereon, a signal source having a predetermined power spectral density, and means for selectively applying the output of said means for sweeping and the output of said signal source to said energization means.

2. A vibration testing system comprising in combination: a shaker, means on said shaker to which a test specimen can be mounted for vibration, energizing means for said shaker constructed and arranged so as to permit adjustment of the frequency response of a signal applied thereto, an accelerometer mounted to detect the acceleration produced by said shaker on said test specimen, amplification means coupled to said accelerometer, a visual reading frequency analyzer to which the output of said amplification means is fed, means for periodically sweeping said frequency analyzer through a band of frequencies at a rate sufficient to provide a continuous visible display thereon and to permit ready adjustment of said energization means to produce a flat response on the sonic analyzer as it is observed, a signal source, and means for selectively applying the output of said means for sweeping and the output of said signal source to said energization means.

3. A vibration testing system simulating a random vibration environment having a predetermined power spectrum density, the combination comprising: a shaker; means on said shaker to which a test specimen can be mounted for vibration; a random signal source for producing a predetermined power spectrum density; energizing means responsive to said random signal source for excitation of said shaker, said energizing means being constructed and arranged so as to permit rapid adjustment of the overall frequency response of the applied signal in each of a plurality of frequency bands; an accelerometer mounted so as to provide a signal corresponding to the acceleration produced by said shaker; amplification means connected to said accelerometer; a visual reading sonic analyzer to which the output of said amplification means is fed; means for periodically sweeping said sonic analyzer through a band of sonic frequencies at a sufficient rate to provide a continuous visual display of the signal from the random signal source as applied to said shaker to thereby permit ready adjustment of said energizing means with attendant observation of said analyzer to produce a substantially flat response of said shaker which corresponds with the predetermined power spectrum density of the vibration testing system.

4. A random vibration testing system comprising in combination: an electromagnetic shaker; means on said shaker to which a test specimen can be mounted for vibration; energizing means for said shaker, said energizing means including a random noise source for producing a random noise signal, a clipping circuit for converting said random noise signal to a signal predetermined peak-to-R.M.S. ratio for the output of said shaker, a compensator having means for adjusting the bandwidth, center frequency and amplitude of the signal applied thereto in each of a plurality of frequency bands, an adjustable bandpass filter and a power amplifier, said power amplifier applying an energizing signal to said shaker; an accelerometer mounted so as to provide a signal corresponding to the acceleration produced by said shaker; amplification means connected to said accelerometer; a visual reading frequency response analyzer to which the output of said amplification means is fed; means for periodically sweeping said analyzer through a predetermined band of frequencies at a rate sufficient to provide a continuous visual display thereon; and means for selectively applying the output of said means for sweeping and the output of said noise source to said compensator.

5. A testing system in which a vibration condition of predetermined power spectrum density may be simulated, the combination comprising: an electromagnetic shaker; means on said shaker to which a test specimen can be mounted for vibration; a signal means for producing an energization signal having a predetermined power spectrum density of a predetermined peak-to-R.M.S. ratio for the output of said shaker; a compensator having a plurality of filters for adjusting the bandwidth, center frequence and amplitude of said signal applied thereto in each of a plurality of frequency bands, said compensator having an amplifier, and base and treble control for the adjustment of said amplifier; an adjustable bandpass filter for receiving a signal from said compensator for setting the overall bandpass of the system; a power amplifier for applying the energizing signal to said shaker; an accelerometer mounted so as to provide a signal corresponding to the acceleration produced by said shaker; amplification means connected to said accelerometer; a visual reading sonic analyzer to which an output of said amplification means is fed; means for periodically sweeping said analyzer through a predetermined band of frequencies at a rate sufficient to provide a continuous visual display thereon of a sine wave which is employed as an aid in first adjusting said compensator to produce a flat response in said shaker and to permit ready adjustment of said compensator a second time to provide said shaker with a substantially flat output response corresponding to said power spectrum density when said energization signal is applied.

References Cited in the file of this patent

UNITED STATES PATENTS

| | | |
|---|---|---|
| 2,729,972 | Schwidetzky | Jan. 10, 1956 |
| 2,782,633 | Stauss et al. | Feb. 26, 1957 |
| 2,839,916 | Van Valkenburg et al. | June 24, 1958 |
| 2,844,777 | Ross | July 22, 1958 |
| 2,917,626 | Usher | Dec. 15, 1959 |
| 2,970,469 | Feldman | Feb. 7, 1961 |
| 3,015,229 | Maki | Jan. 2, 1962 |
| 3,015,949 | Arnold | Jan. 9, 1962 |

OTHER REFERENCES

"Random Noise Vibration Test Procedure," by Wilbur Du Bois, printed in the February 1959 issue of Vibration Notebook, by the MB Mfg. Co.

"Exciter/Specimen Equalization Techniques," printed in the February 1957 (vol. 3, No. 1) issue of Vibration Notebook, by the MB Mfg. Co.